Figure 1:
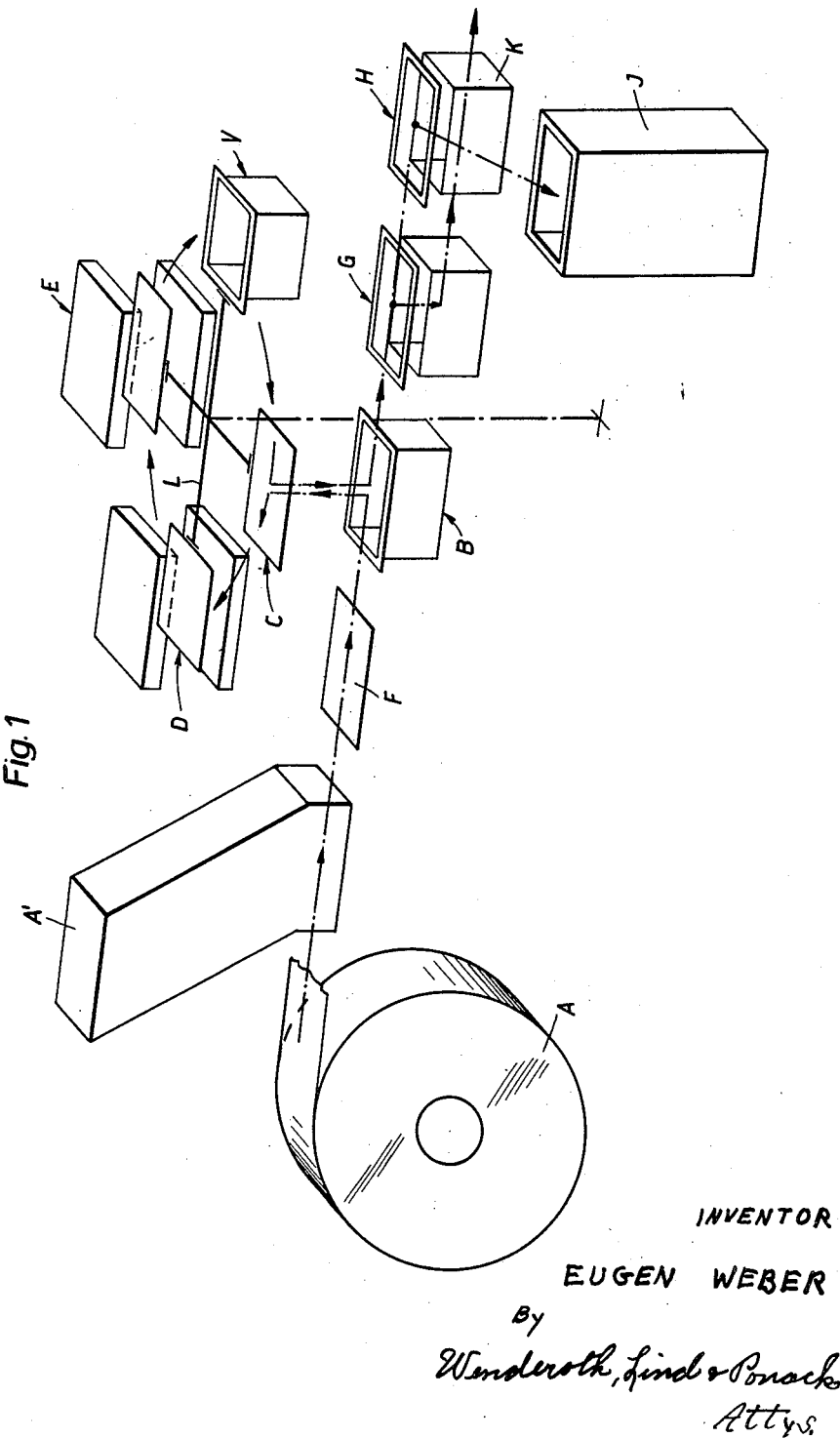

Dec. 26, 1961    E. WEBER    3,014,239
MACHINES FOR PRODUCING FORMED ARTICLES
MADE OF THERMOPLASTIC FOIL MATERIAL
Filed March 2, 1960    5 Sheets-Sheet 1

INVENTOR
EUGEN WEBER

Dec. 26, 1961 E. WEBER 3,014,239
MACHINES FOR PRODUCING FORMED ARTICLES
MADE OF THERMOPLASTIC FOIL MATERIAL
Filed March 2, 1960 5 Sheets-Sheet 3
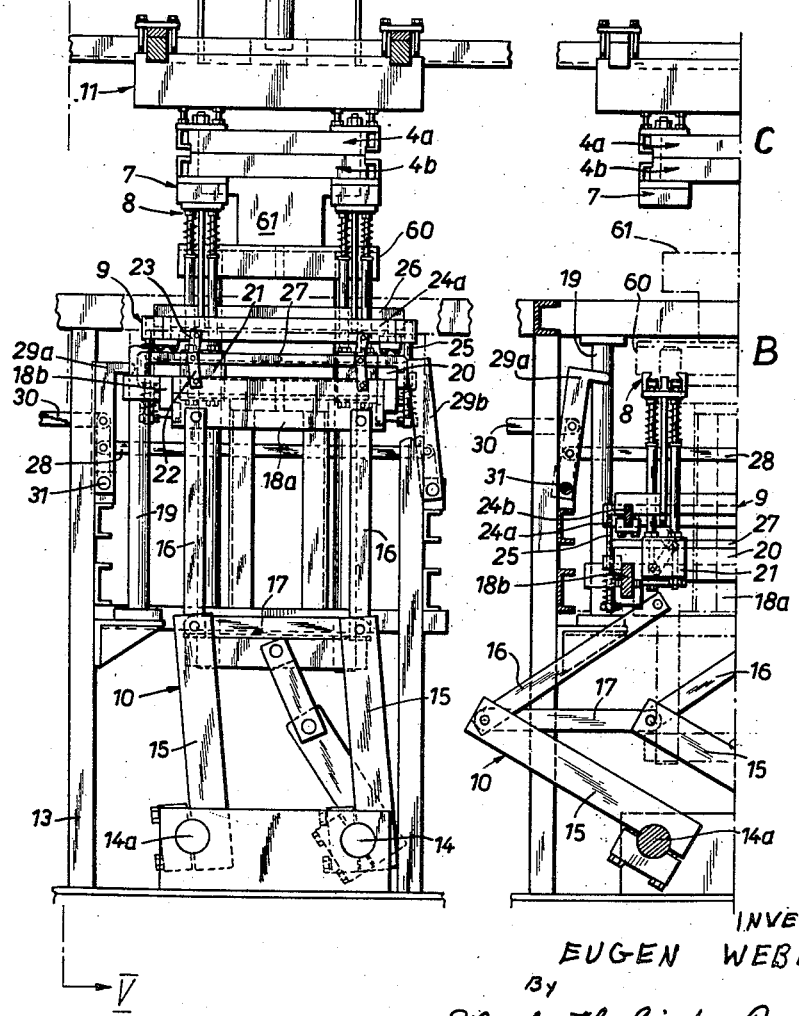
INVENTOR
EUGEN WEBER
By
Wenderoth, Lind + Ponack
Attys.

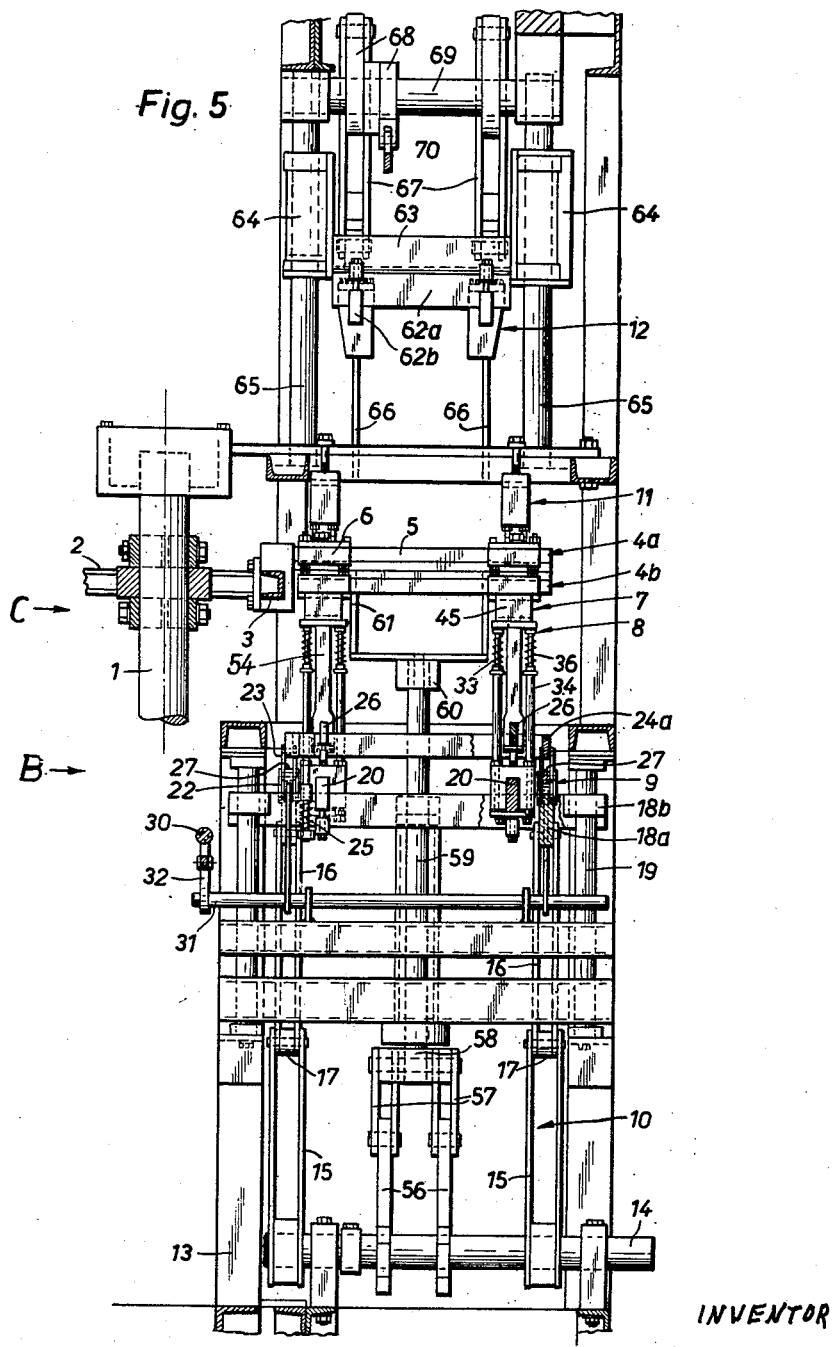

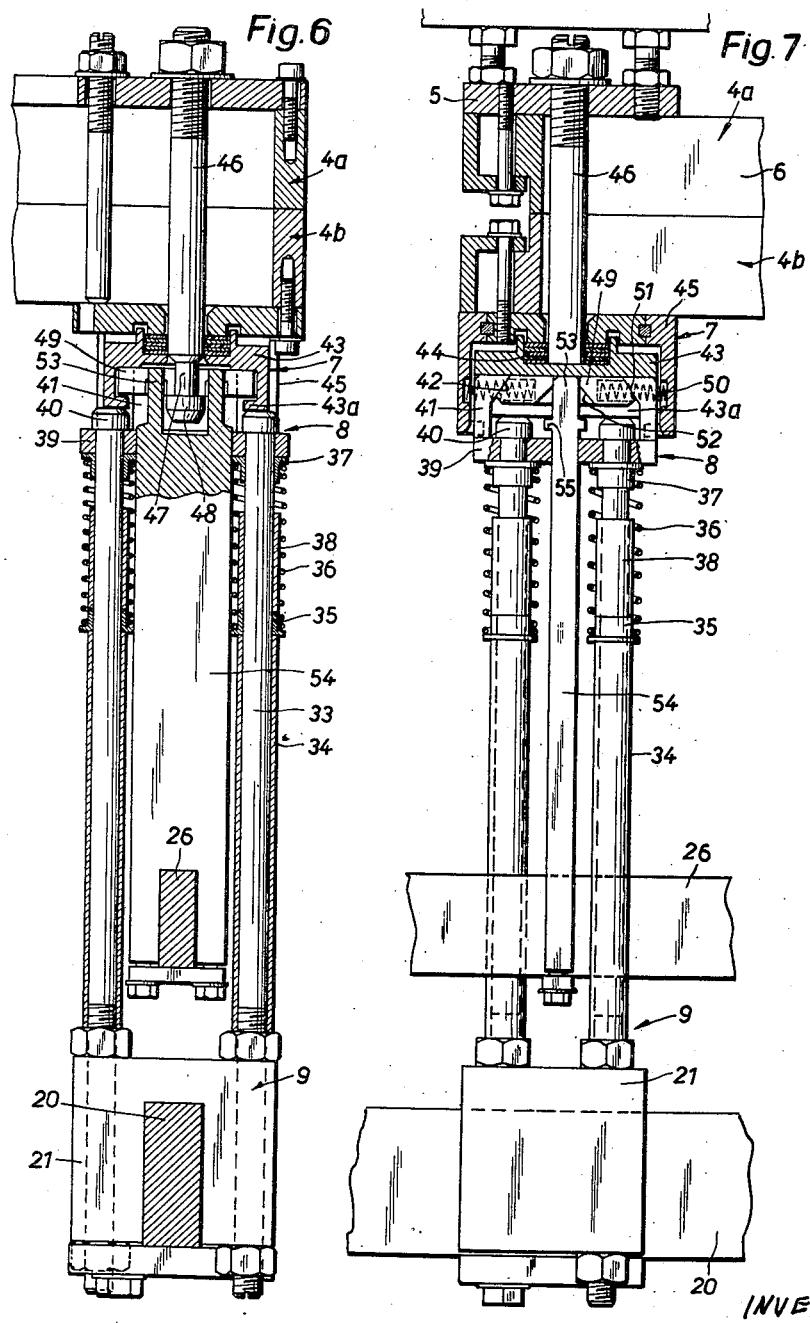

United States Patent Office 3,014,239
Patented Dec. 26, 1961

3,014,239
MACHINES FOR PRODUCING FORMED ARTICLES MADE OF THERMOPLASTIC FOIL MATERIAL
Eugen Weber, Zurich, Switzerland, assignor to Hydro-Chemie Aktiengesellschaft, Zurich, Switzerland
Filed Mar. 2, 1960, Ser. No. 12,312
Claims priority, application Switzerland Mar. 4, 1959
8 Claims. (Cl. 18—19)

The present invention relates to a machine for the production of formed articles made of thermoplastic foil material.

Machines for forming thermoplastic foils are known, in which the foil to be formed is consecutively subjected to different operations on various operating stations of the machine. There are also known machines of this kind, in which several operating stations are arranged on a circle and a star-shaped conveyer member is provided to move the foil held in a clamping frame step by step to the individual stations. The main disadvantage of known machines of this type consists in that the actuating mechanisms of the clamping frames, which require relatively great closure power, result into large moved masses, so that relatively low operating speeds may only be obtained.

It is an object of the invention to provide a machine for the production of formed articles, in which in comparison to known machines the moved masses can be held, comparatively small and the operating speeds correspondingly high.

In a machine according to the invention having a conveyor member for the foil to be deformed, passing a plurality of operating stations, the conveyor member carries a number of two-piece clamping frames corresponding to the number of operating stations supplied by said member, each frame having a lower frame portion which, for the purpose of charging or discharging the frames can be completely separated from an upper frame portion, the lower portion being provided with a bolting device for interlocking the two frame portions, which device is operable by means of a mechanism which is stationary with respect to the conveyer member and simultaneously serving for separating and for connecting the two parts of said frame.

Suitably, a rotatable conveyer member is provided and the arrangement is made so that the supply of foil to the conveyor member and the discharge of the deformed foil from the conveyor member are effected at the same operating station, whereby the removal of the formed foil from this station after having passed the remaining operating stations may take place in the same direction as the supply of the unformed foils to this station. In this manner, the advantage of the machines, in which the individual operating stations are arranged along a rectilinear conveying path, is combined with the advantage of those machines known per se, in which the individual operating stations are situated on a circle in spaced angular relationship, without the necessity of accepting the drawbacks of said machines.

These known disadvantages are mainly due to the fact that machines having rectilinear conveying paths though possessing a perfectly controllable sequence of operation and permitting a plurality of them to be placed side by side, require much space and necessitate the use of relatively complicated driving, controlling and conveying means, while on the other hand the known machines with operating stations disposed on a circle are more compact and show easier control and transport conditions, but require the supply and removal of the material in different directions and thereby render more difficult the juxtaposition of a plurality of machines supplying a common receiving station for the formed articles.

Figure 2:
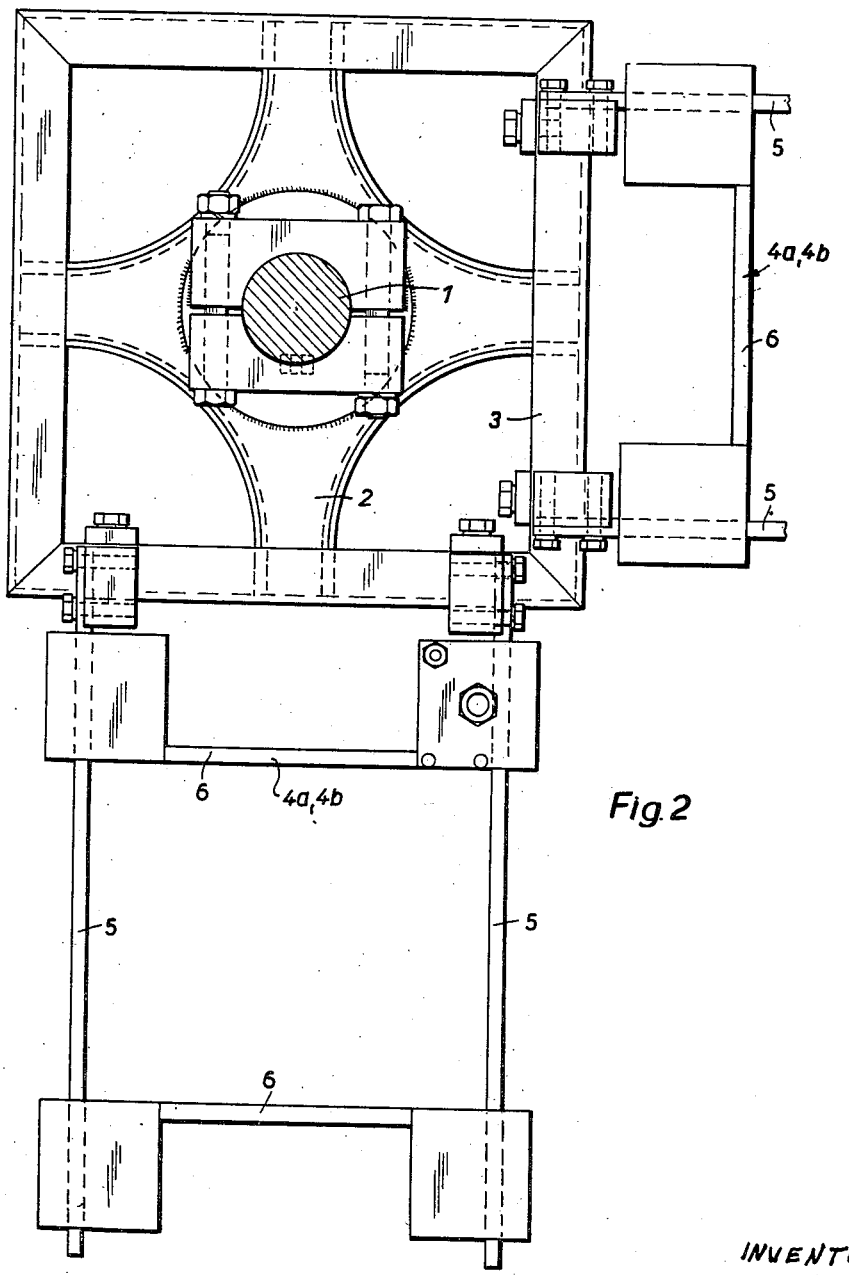

The present invention will now be described in more detail with reference to the accompanying drawings illustrating, by way of example, a preferred embodiment of the invention and in which:

FIGURE 1 is a perspective view of the operating diagram of a machine according to the invention, FIGURE 2 shows a cross-section through the central portion of the machine, FIGURE 3 is a front view of the clamping zone of the machine in a first operating position of the movable machine parts, FIGURE 4 is a view, analogous to FIGURE 3, showing a second operating position of the movable machine parts, FIGURE 5 shows a vertical section, partially broken away, along the line V—V in FIGURE 3, FIGURE 6, drawn to a larger scale, shows a vertical section through a detail of FIGURE 5, and FIGURE 7 is a vertical section turned through 90° and extending through the detail shown in FIGURE 5.

The machine shown for the automatic production of formed articles of thermoplastic foil material comprises a storage station A for the foil material, which station in the present case is represented by a supplying roll. A cutting device not shown, following the roll A serves for severing the strip unwinding from the roll and cutting it into individual foils F used as work piece. As modification there is shown in FIGURE 1 a storage container A' from which individual foils F may be delivered.

The machine, moreover, comprises a plurality of working stations B, C, D, E, V, G and H as well as a container J for the reception of waste material accumulating during the production of the article K. The following working stations are involved.

B: Loading station for the introduction of the foils F into the clamping frames. At the same time, unloading station for the removal of the deformed foils from the clamping frames.
C: Locking station for clamping the foils into the clamping frames. Simultaneously, unlocking station for unclamping the foils from the clamping frames.
D: First heating station.
E: Second heating station.
V: Forming station.
G: Severing station for separating surplus material from the formed foil, and
H: Ejection station for ejecting excess material cut away from the formed article.

As evident from FIGURE 1, the operating stations are arranged in two groups. The stations A (or A'), B, G and H belong to the first group and are arranged along a rectilinear conveyer path within a common operating plane. The working stations C, D, E and V belong to the second group and are situated, spaced apart at angular distances of 90°, on a circle the plane of which is arranged a certain distance above the conveyer path, the operating station C being located exactly above the station B. The conveying means associated with the rectilinear conveyer path are not illustrated, while at L the conveying device is indicated which supplies the operating stations arranged on the elevated plane with clamping frames to be explained more in detail later on.

From the above the following operating cycle of the machine results: The foils F are moved to the station B and introduced into a clamping frame at this station; the frame is closed while the foil is simultaneously raised to the operating station C, where clamping of the foil and interlocking of the clamping frame takes place. The conveying device L carrying the clamping frame moves the clamped foil to the first heating station D, where preheating of the foil is effected. In a next step the foil passes to the second heating station E, where it is heated to deforming temperature. Subsequently, the conveying device feeds the foil to the forming station V, where the foil is given the desired shape by means of a vacuum-forming device. During the next step the foil thus formed into an article is returned to the station C, where the clamping frame is opened. Then the foil is again passed to the station B situated in the lower plane, taken out of the frame and moved from there along the rectilinear conveyer path to the station G. Here, the removal of excess material (e.g. of the clamping flange) from the actual formed article K, takes place. This article then passes out of the machine in rectilinear direction, while the severed excess material fed to the station H is ejected into the receptacle J.

In this connection it should be noted that at the stations B and C always first the unlocking of the frame and the removal of the formed foil from the clamping frame takes place and immediately next the loading of said frame with a new foil and also the locking of the frame is effected. An example of the operating stations B and C is explained hereafter in more detail with reference to FIGURES 2-7.

Referring to the drawings, the numeral 1 designates the upright driving shaft of a transporting member 2, to the arms of which a carrier frame 3 of square plan section is secured. The top portion 4a of a two-piece clamping frame 4a, 4b is supported freely floating on each of the four legs of the carrier frame 3. In order to be able to adapt the clamping frames to the various sizes and shapes of the foils, each of the two frame parts are built from two rail pairs; it is for instance evident from FIGURE 2 that the rail pair 5 of each clamping frame part 4a is adjustably secured to the associated leg of the carrier frame 3, while on the other hand the rail pair 6 of each clamping frame part 4a is adjustably mounted on the associated rail pair 5. As shown particularly in FIGURES 6 and 7, a locking device 7 is provided on the bottom side of each lower clamping frame part 4b, namely on all four corners thereof, and adapted to be locked or unlocked by means of an actuating mechanism 8. Said mechanism provides the head portion of a lifting device 9 which can be driven by means of a linkage 10 from a driving motor, not shown, of the machine. Actuating mechanism 8, lifting device 9 and linkage 10 form parts of the operating stations B and C. Above these stations an abutment 11 is provided, against which bears the clamping frame 4a, 4b which occupies the operating station C. Moreover, an ejecting mechanism 12 is provided above the operating station C for ejecting the deformed foil from the unlocked and opened clamping frame.

The above mentioned mechanisms and devices 7—12 are formed in detail as follows:

A shaft 14, driven by the motor through a cam controlled device not shown, and an auxiliary shaft 14a extending parallel thereto are pivotally supported in the base of the machine frame 13. Mounted on each of the two shafts 14, 14a are two twin levers 15 of the linkage 10, the free ends of which levers are linked each with an additional twin lever 16. The hinge points of the lever pairs 15, 16 of the shaft 14 are operatively connected by link rods 17 with corresponding points of the lever pairs 15, 16 of the shaft 14a. The free ends of the levers 16 are linked to a supporting frame 18a, 18b which is supported on upright guide bolts 19 arranged on the frame 13, so as to be vertically movable. Two supporting rails 20 arranged parallel to the frame parts 18a are adjustably secured on the frame parts 18b. Supporting bearings 21 are mounted on these supporting rails and adjustable along said rails.

Furthermore, two twin levers 22, the free ends of which in turn are hingedly connected to twin levers 23, are linked each on the supporting frame parts 18a. The free ends of the levers 23 are linked on an auxiliary supporting frame 24a, 24b which is supported on upright guide bolts 25, arranged on the supporting frame 18a, 18b, so as to be vertically movable. Two supporting rails 26 which extend parallel to the auxiliary frame parts 24a are adjustably secured to the frame parts 24b. The hinge points of the two lever pairs 22, 23 engaging each frame part 24a are operatively interconnected each through a control rail 27. For the actuation of these control rails 27 pivoted arms 29a, 29b are provided, which are laterally supported on the machine frame 13 and operatively interconnected by an intermediate lever 28. By means of a connecting rod 30 the pivoted arms 29a, 29b are coupled with the motor driven cam controlling device, the shaft 31 connecting the two pivoted arms 29a being coupled by a pivoted lever 32 to the connecting rod 30, while the elements 18a, 18b—32 represent the lifting device 9 mentioned above.

The two supporting rail pairs 20 and 26 of the lifting device 9 carry the actuating mechanism 8 of the said locking device 7. The supporting bearings 21 mounted on the rails 20 carry each two upright pressure bolts 33 which are arranged on points situated diagonally opposite each other and upon each of which a sleeve 34 is slipped. Abutting against each sleeve 34 is a limit sleeve 35 against which bears one end of a coil spring 36. The other end of said spring exerts pressure against a second abutment sleeve 37 which is movably mounted on the associated pressure bolt 33. A spring guiding sleeve 38 is arranged between the abutting sleeves 35, 37. A base plate 39 of the locking device 7 is fixed on the two abutting sleeves 37 of the pressure bolts 33 associated with each supporting bearing 21. The free ends of the pressure bolts 33 traversing the base plate 39, are provided each with a head 40. Two bars 41 are secured to the base plate 39 and have each of their end portions provided with a key surface 42; said surfaces 42 of the two bars 41 of each locking device 7 converging upwardly. A thrust plate 43 having side flanges 43a, against which abut the heads of the pressure bolts, is situated above the two bolts 41. Accommodated within a recess of the top face of the thrust plate 43 is a cup spring 44, by means of which the thrust plate 43 bears against the cover of a casing 45 secured to the lower part 4b of the clamping frame. A supporting bolt 46, positioned by means of a nut at the upper part 4a of the clamping frame, protrudes through the ceiling of the casing 45, the cup spring 44 and the thrust plate 43 in downward direction; said bolt has a reduced end shaft 47 which in turn ends into a head 48 having a conically tapered end portion. Two locking keys 49, which are subjected to biasing action each by means of a coil spring 50 abutting against the casing 45, are arranged within the thrust plate 43. The outwardly directed sides of the locking keys 49 are provided each with a key surface 51, destined to cooperate with the key surfaces 42 of the bars 41, while the inwardly directed sides of the locking keys 49 have each a key surface 52 extending parallel to the outer key surface 51. The key surfaces 52 and also the vertical surfaces of the locking keys 49 adjacent the latter are arranged for cooperating with the inclined end surfaces or vertical lateral surfaces on the forked head 53 of a traverse rod 54 which is secured to said rod, so as to be movable along the supporting rail 26. The traverse rod 54 projects from below through the base plate 39 of the bolts 41 and is provided with lateral ribs 55 in its portion extending beyond this plate. The parts 46—48 form the portion of the locking device 7 which remains on the frame part even when the clamping frame 4a is opened, while the parts 43—45, 49, 50 form that part of the locking device 7 which remains on the clamping frame only at locked condition of the latter and, when the said frame is opened, can be separated with the frame part 4b from the frame part 4a. The parts 33—41 and 53—55 represent the operating mechanism 8 of the locking device.

Moreover, the main shaft 14 carries the lever pair 56 which is pivotally connected to a support 58 by means of twin link rods 57. Mounted on the support 58 are traverse rods 59, which are guided so as to be vertically displaceable in the machine frame 13 and carry on a traverse 60a box 61 for the reception of the formed foil.

The ejection device 12 arranged above the station C comprises a frame formed by longitudinal bars 62a and cross bars 62b, whereby the longitudinal bars 62a are secured to a support 63 and the cross bars 62b adjustably arranged on the longitudinal bars 62a. The support 63 is guided on columns 65, secured to the machine frame 13, so as to be vertically movable by means of guides 64. Four downwardly projecting rams 66 are adjustably secured to the cross bars 62b. Pivoted on the support is a pair of twin levers 67 which are connected to a linkage 70 by means of a cranked lever 68 having a pivoted shaft 69 supported in the frame; the linkage 70 is connected to the cam controlled device of the machine in a manner not shown. In this connection it has to be noted that also the support 11 can be removed from the clamping frame, occupying the station C, in a manner not shown, or can be caused to abut against this frame.

The operation of the described machine is as follows: It is assumed that the individual machine parts occupy the position shown in FIGURES 3 and 5–7. As indicated in these figures, the clamping frame 4a, 4b situated on the station C is closed and it is assumed that it contains a foil to be formed from thermoplastic material. In order to permit a rotation through 90° of the star-shaped conveyer member 1, i.e. to be able to move the clamping frame 4a, 4b containing the foil to the first heating station D, the actuating mechanism 8 must lock the bolting device 7 and subsequently must be lowered by means of the operating device 9. For this purpose the pivoted arms 29a, 29b are turned from their left hand pivoting position (in FIG. 3) into the right hand pivoting position (as shown e.g. in FIGURE 4) through the push rod 30 by the intermediary of the cam controlling device; said arms thereby urge the control rails 27 from the left end positions, shown in FIGURE 3, to the right, whereby the levers 22, 23 are correspondingly bent towards the right. The auxiliary frame 24a, 24b together with the supporting rails 26 is thereby lowered with respect to the main frame 18a, 18b with its supporting rails 20. Accordingly, the connecting rod 54 is moved downwardly. As soon as the inner key surfaces 52 of the locking keys 49 become flush with the inclined edges of the traverse rod head 53, they start to slide inwards under the influence of the springs 50. Simultaneously, the shaft 14 is rotated in the direction of lowering the main frame 18a, 18b by means of the cam controlling device. Thereby the pressure bolts 33, and together with the latter the base plate 39 with the bolts 41 are also lowered. As shown particularly in FIGURE 7, lowering of the bolts 41 is rendered possible, since, as mentioned, the locking keys 49 yield inwardly; the key surfaces 42 of the bars 41 then slide downwardly along the surfaces 51 of the locking keys 49. As soon as the head 53 of the traverse rod completely clears the path for the locking keys 49 in inward direction, the bars 41 can entirely emerge downwardly from the locking device 7. The locking keys 49 then abut against the tapered neck 47 of the bolt 46. Then the relief of load from the pressure bolts 33 is effected, whereupon the thrust plate 43 is urged by means of the spring 44 against the casing 45 and accordingly the two clamping frame parts 4a and 4b, between which the foil not shown is clamped with its peripheral edge portion, are firmly retained in their clamping position.

While now the transport centre unit 1 continues to rotate through 90° in clockwise direction and thus moves the clamping frame containing the foil to the first heating station D, the lifting device 9 together with the actuating mechanism 8 carried by it is moved further downwards into the lower end position of the stroke as shown in FIGURE 4. At the same time also the box 61 is lowered into the position shown in FIGURE 4 by dot-and-dash-lines, by means of the levers 56, 57. Subsequently, when the next clamping frame carried by the conveyer member 1 approaches the station C, the lifting device 9 (together with the box 61) is moved upwards again. The clamping frame 4a, 4b arriving from the forming station V carries a deformed foil. Since the locking keys 49 are in their inner locking position, the bolts 41 slide freely upwards into the position shown in FIGURE 7. In order to unlock the bolting device 8, the locking keys 44 must first be released by the pressure bolts 33 through the thrust plate 43, whereupon the traverse rod 54 is again lifted into its starting position, which is effected by turning the pivoted arms 29a, 29b in FIGURE 4 towards the left and by correspondingly moving the control rail 27 towards the left into the position shown in FIGURE 3. Then, the head 53 of the traverse rod 54 first strikes with its bevelled edges against the inner key surfaces 52 of the locking keys 49, so that the latter are outwardly forced against the influence of the springs 50; as soon as the vertical section of the lateral surfaces of the traverse rod head 53 slide upwardly on the vertical inner surface portions of the locking keys 49, the latter assume their outermost end position (FIGURE 7) and abut with their key surface 51 against the key surface 42 of the bars 41; the locking device 7 is thereby unlocked, i.e. the locking keys 49 are out of engagement with the reduced neck 47 of the bolt 46; the locking device 7 on the other hand is then coupled to the lifting device 9 by means of its actuating mechanism 8. Subsequently, the lifting device 9 is brought down by lowering the supporting rail 20, whereby the bottom portion 4b of the clamping frame, fixed on the casing 45 of the locking device 7, is lowered. Simultaneously, the ejection device 12 is actuated by the cam controlling device so as to lower the rams 66, thereby these rams enter from above into the clamping frame and push the deformed foil together with the box 61 downwards. Simultaneously with the lifting device 9 the box 61 is moved downwardly for a certain length (position shown in dot-and-dash-lines in FIGURE 4) and stopped in that position. Since the clamping frame part 4b is downwardly moved beyond the box 61, as shown in FIGURE 4, in a subsequent step the deformed foil, retained between the rams 66 and the box 61, can then be removed from the box 61 by the conveying means not shown of the rectilinear transporting paths and fed to the severing station C, while the box 61 is supplied with a new foil from the storage station A. The lower clamping frame part 4b is then raised from its lower end position simultaneously with the box 61. The lifting device 9 and with it the actuating mechanism 8 together with locking device 7 and frame part 4b are again raised into the position shown in FIGURE 3, whereupon in the manner already described the locking of the bolting device 7 holding together the frame parts 4a, 4b and subsequently the lowering of the actuating mechanism 8 by means of the lifting device 9 into the position shown in FIGURE 3 takes place.

The foil gripped in a clamping frame 4a, 4b is then preheated in the first heating station D, subsequently brought to deforming temperature in the second heating station E, and then deformed to the desired shaped body in the forming station V. Thereafter the lowering of the frame part 4b together with the deformed foil is effected at the station C and after the clamping frame has been unloaded the continued transport of the deformed foil to the severing station G takes place. At that station the clamping edge portion of the foil, forming excess material, is separated from the formed body. After the continued transport of the body K and the severed edge portion to the station H the foil edge is ejected into the container J, while the finished formed body K is pushed out of the machine.

A high rate operating speed can be selected for the described machine, since due to the complete separability of the clamping frames the mechanism required for producing the closure forces does not concurrently rotate, but remains stationary and the rotating masses are thus kept comparatively small. Since the heating periods, the forming period, the separation time and the ejection time can also be kept very short, the operating speed of the machine largely depends on the time required for loading, locking, unlocking and unloading the clamping frames. This time, however, owing to the superposition of the stations C and B can be kept very short, so that in actual practice a period of only a few seconds is required for a complete operating cycle.

I claim:

1. A machine for producing formed articles of synthetic thermoplastic foil material, comprising a conveyor member for the foils having a plurality of stations disposed along the path of the conveyor member, a portion of said conveyor member being in one plane and the remainder of said conveyor member being in another plane spaced from and parallel to said one plane, a plurality of two part frames, the parts of said frames being relatively movable toward and away from each other in the direction in which said planes are spaced, said frames having means thereon for locking said frame parts to each other, the parts of the frames remote from said portion of said conveyor member being on said remainder of said conveyor member, at least one station of the said portion of said conveyor member being aligned with a station on the remainder of said conveyor member, and a frame moving means being positioned at said at least one station and fixed relative to the conveyor member movement, said frame moving means moving the parts of said frames closer to said portion of said conveyor member between said portion of said conveyor member and said remainder of said conveyor member for feeding foils to said remainder of said conveyor member and returning formed foils from said remainder of said conveyor member to said portion of said conveyor member, said frame moving means comprising an actuator for said locking means for locking said locking means when the said closer frame parts are moved toward the other frame parts to change a foil therebetween and for unlocking said locking means when said closer frame parts are moved away from said remote frame parts for releasing a formed foil.

2. A machine for producing formed articles of synthetic thermoplastic foil material, comprising a conveyor member for the foils having a plurality of stations disposed along the path of the conveyor member, a portion of said conveyor member being in a lower horizontal plane and the remainder of said conveyor member being in an upper horizontal plane, a plurality of two part frames, the parts of said frames being relatively movable toward and away from each other in the vertical direction and having means thereon for locking said frame parts to each other, the upper frame parts being on said remainder of said conveyor member, at least one station of the said portion of said conveyor member being immediately below a station on said remainder of said conveyor member, and a frame moving means being positioned at said at least one station and fixed relative to the conveyor member movement, said frame moving means moving the lower parts of said frames between the said portion of said conveyor member and said remainder of said conveyor member for feeding foils to said remainder of said conveyor member from said portion of said conveyor member and returning formed foils from said remainder of said conveyor member to said portion of said conveyor member, said frame moving means comprising an actuator for said locking means for locking said locking means when the lower frame parts are moved toward said upper frame parts to clamp a foil therebetween and for unlocking said locking means when said lower frame parts are moved away from said upper frame parts for releasing a formed foil.

3. A machine for producing formed articles of synthetic thermoplastic foil material, comprising a lower linear conveyor portion having a storage station, a loading station, a separating station for severing excess material from a formed foil and disposing of the excess severed material, and an upper circular conveyor portion having a loading station positioned vertically above the loading station on said lower linear conveyor portion, said upper conveyor further having a plurality of heating stations and at least one forming station, a plurality of two part clamping frames, the number of said frames corresponding to the number of stations on said upper conveyor portion and each frame having an upper part secured on the upper conveyor portion and a lower part movable toward and away from said upper part in the direction of said lower conveyor portion, a bolting device on each lower frame portion for interconnecting the lower and upper frame portions, and a frame loading and unloading means positioned below the loading stations on said conveyor portions and stationary relative to the movement of said conveyor portions, said frame loading and unloading means being movable up and down between said lower conveyor portion and said upper conveyor portion and having an actuating means for said bolting device actuating said bolting device to free said frame parts from each other when said frame loading and unloading means moves downwardly with a formed foil, and actuating said bolting device to secure said frame parts to each other when said frame loading and unloading device moves upwardly with an unformed foil.

4. A machine according to claim 3, wherein each clamping frame part consists of adjustable cross bars and longitudinal bars, bolts being provided for locking together the clamping frame portions, said bolts being anchored on the top corners of the upper frame parts and projecting downwardly into the associated bolting device, and said bolting device having two releasable locking keys for each of said bolts which engage the ends of said bolts for locking them.

5. A machine according to claim 4, in which the frame loading and unloading means comprises a vertically displaceable main frame, bars on said main frame to engage behind the locking keys of the bolting devices and to couple the bolting devices with the lifting device, an auxiliary frame vertically displaceable on said main frame to a limited extent with respect to the main frame, traverse rods on said auxiliary frame associated with the locking devices, the heads of said rods, when the bars and introduced into the locking device, engaging said locking keys to move the locking keys out of engagement with the said bolts and in coupling engagement with said bars.

6. A machine as claimed in claim 5 in which said frame loading and unloading means further comprises a box, and box lifting and lowering means on which said box is mounted for raising said box to immediately beneath a lower frame part clamped to an upper frame part in the loading station on said upper conveyor portion when said clamping frame has a formed foil therein and lowering said box only a part of the way between said upper conveyor portion and said lower conveyor portion while the lower frame part is lowered all the way to the lower conveyor part by said frame loading and unloading means, whereby the formed foil is ejected from the lower frame part by said box.

7. A machine as claimed in claim 6 in which said frame loading and unloading means further comprises an abutment above said loading station of said upper conveyor portion, and raising and lowering means on which said abutment is mounted for moving said abutment into and out of contact with an upper frame part in the loading station.

8. A machine as claimed in claim 7 in which said frame loading and unloading means further comprises an ejecting means connected to said box lifting and lowering means for moving said ejecting means toward an upper frame part in the loading station when said box is raised for ejecting a formed foil from the upper frame part onto said box.

References Cited in the file of this patent

UNITED STATES PATENTS

| | | |
|---|---|---|
| 1,318,700 | Skolnick | Oct. 14, 1919 |
| 2,229,613 | Strauch | Jan. 21, 1941 |